US005884882A

United States Patent [19]

Nada et al.

[11] Patent Number: 5,884,882

[45] Date of Patent: Mar. 23, 1999

[54] PEDESTAL FOR SUPPORTING EQUIPMENT

[75] Inventors: Minoru Nada; Masaki Takahashi, both of Kawasaki; Yumiko Osawa, Yokohama, all of Japan

[73] Assignee: Canon Kabushiki Kaisha, Tokyo, Japan

[21] Appl. No.: 837,994

[22] Filed: Apr. 15, 1997

Related U.S. Application Data

[60] Continuation of Ser. No. 509,661, Jul. 31, 1995, abandoned, which is a division of Ser. No. 437,675, May 9, 1995, which is a division of Ser. No. 148,500, Nov. 8, 1993, abandoned.

[30] Foreign Application Priority Data

| | | | |
|---|---|---|---|
| Nov. 9, 1992 | [JP] | Japan | 4-298720 |
| Nov. 9, 1992 | [JP] | Japan | 4-322287 |
| Jul. 15, 1993 | [JP] | Japan | 5-196661 |

[51] Int. Cl.[6] .......... F16M 11/24

[52] U.S. Cl. .......... 248/188.2; 211/207; 108/147

[58] Field of Search .......... 248/188.3, 157, 248/188.7, 188.9, 188.2, 163; 108/147, 50, 141, 144; 211/207

[56] References Cited

U.S. PATENT DOCUMENTS

| | | | |
|---|---|---|---|
| 4,440,096 | 4/1984 | Rice et al. | 103/3 |
| 4,637,322 | 1/1987 | Hampshire et al. | 108/147 X |
| 4,714,024 | 12/1987 | Wallin et al. | 108/147 X |
| 4,805,538 | 2/1989 | Fisher et al. | 108/147 X |
| 4,807,836 | 2/1989 | Price et al. | 108/147 X |
| 4,828,208 | 5/1989 | Peterson et al. | 108/147 X |
| 5,116,004 | 5/1992 | Luecke | 248/188.5 X |
| 5,174,223 | 12/1992 | Nagy et al. | 108/50 |
| 5,190,302 | 3/1993 | Trotta | 280/35 |
| 5,224,429 | 7/1993 | Borgman et al. | 108/147 |
| 5,259,326 | 11/1993 | Borgman et al. | 108/147 |
| 5,271,320 | 12/1993 | Reneau | 108/147 X |
| 5,313,892 | 5/1994 | Tice | 108/147 |
| 5,320,047 | 6/1994 | Deurloo et al. | 108/147 X |
| 5,322,025 | 6/1994 | Sherman et al. | 108/147 |
| 5,323,695 | 6/1994 | Borgman et al. | 108/147 |
| 5,348,324 | 9/1994 | Trotta | 280/35 |
| 5,352,033 | 10/1994 | Gresham et al. | 312/312 |

FOREIGN PATENT DOCUMENTS

| | | | |
|---|---|---|---|
| 3125904 | 1/1983 | Germany | 108/147 |

*Primary Examiner*—Leslie A. Braun
*Attorney, Agent, or Firm*—Fitzpatrick, Cella, Harper & Scinto

[57] ABSTRACT

A concave space is formed at a predetermined position of a lower portion of a pedestal for supporting a copy machine or the like. An up switch, a standard position moving switch, and a down switch are arranged. When the up switch is depressed, the pedestal on which the copy machine is placed moves the copy machine upward to a predetermined position. When the down switch is depressed, the pedestal moves downward to a predetermined position. When the standard position moving switch is depressed, the pedestal moves to a standard position. Therefore, a wheelchair user can easily operate the copy machine.

14 Claims, 23 Drawing Sheets

PEDESTAL FOR SUPPORTING EQUIPMENT

This application is a continuation of application Ser. No. 08/509,661, filed Jul. 31, 1995, now abandoned, which is a division of application Ser. No. 08/437,675, filed May 9, 1995, now pending, which is a division of application Ser. No. 08/148,500, filed Nov. 8, 1993, now abandoned.

BACKGROUND OF THE INVENTION

1. Field of the Invention

The present invention relates to a pedestal for supporting an equipment such as an office equipment.

2. Related Background Art

A conventional pedestal for supporting an image forming apparatus (e.g., a copy machine or a facsimile apparatus) or a cabinet is used to place the above equipment or cabinet at an appropriate height for a user. The pedestal can be used in a stable state wherein it withstands the weight of an object placed thereon. The pedestal has casters at its bottom portions and can be moved on the installation surface.

However, sufficient consideration is not taken for installation locations and installation circumstances for such a pedestal. For example, as shown in FIG. 19, when a user on a wheelchair 61 is to change the direction of the wheelchair 61, an area of about 140 cm ×170 cm is required. When a copy machine 62 is placed on the above pedestal in an office, it is rather difficult to secure a passage having a width of 140 cm in front of the copy machine 62 in consideration of the present office situation suffering from a lack of space.

As shown in FIGS. 20 and 21, when a wheelchair user 63 uses a copy machine 62 installed in a narrow passage, and the wheelchair 63 is moved toward the front of the copy machine 62, footrest portions 64 of the wheelchair 61 abut against the front surface of the pedestal. For this reason, the wheelchair user must operate the copy machine 62 while the side of the body of the user faces the front surface of the copy machine 62. In addition, the direction of the wheelchair cannot be changed during use of the copy machine, resulting in poor operability. As shown in FIG. 22, when a wheelchair user 63 faces the front surface of a copy machine 62, a space is formed between the copy machine 62 and the wheelchair user due to the presence of footrest portions 64, thus making it difficult to operate the copy machine 62.

Conventional copy machines are designed to have a height of about 90 cm to 100 cm, i.e., a height for facilitating to place an original on a platen glass arranged at the upper surface of a copy machine or to operate operation keys for a person, having a height of 150 cm or more, who stands in front of the copy machine. This height is ideal when the copy machine is installed on an office floor.

When the copy machine installed on the office floor is used by a wheelchair user or when the copy machine is used by a user who sits on a chair due to a large number of copies, the operation surface is too high to operate, making it difficult to operate the copy machine.

More specifically, as shown in FIG. 23, operations such as an operation for placing an original, and operations for setting a copy count and a copy density and for depressing a start key on the operation panel are difficult because the operation surface is too high. Jam processing and an operation for replenishing a paper cassette with paper sheets are difficult to perform because the door on the front surface of the copy machine and the paper cassette are located at lower positions which are not easily accessible to a wheelchair user.

SUMMARY OF THE INVENTION

It is an object of the present invention to provide a pedestal which solves the conventional problems described above.

It is another object of the present invention to provide a pedestal which makes it possible to improve operability for a wheelchair user.

It is still another object of the present invention to provide an improved pedestal, wherein footrests of a wheelchair do not abut against the pedestal when a wheelchair user operates an office equipment placed on the pedestal.

It is still another object of the present invention to provide an improved pedestal which makes it possible for a standing user or a wheelchair user to use office equipments.

The above and other objects, features, and advantages of the present invention will be apparent from the detailed description of the present invention in conjunction with the accompanying drawings.

DESCRIPTION OF THE PREFERRED EMBODIMENTS

Figure 1:
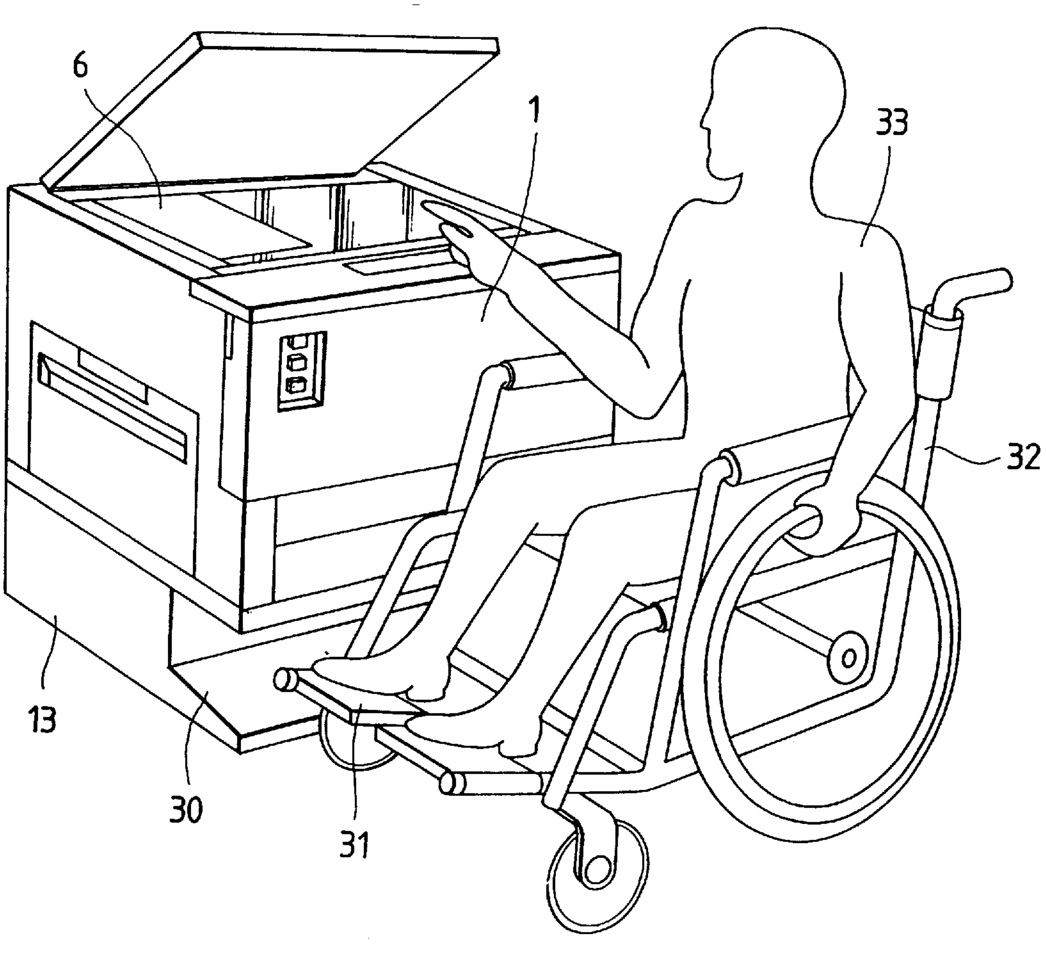
FIG. 1 is a perspective view showing a state in which a copy machine is placed on a pedestal.

Preferred embodiments of the present invention will be described with reference to the accompanying drawings. FIG. 1 is a perspective view showing a state in which a copy machine is placed on a pedestal, and FIGS. 2 and 3 are views for explaining a direction change operation by a wheelchair user.

Figure 2:
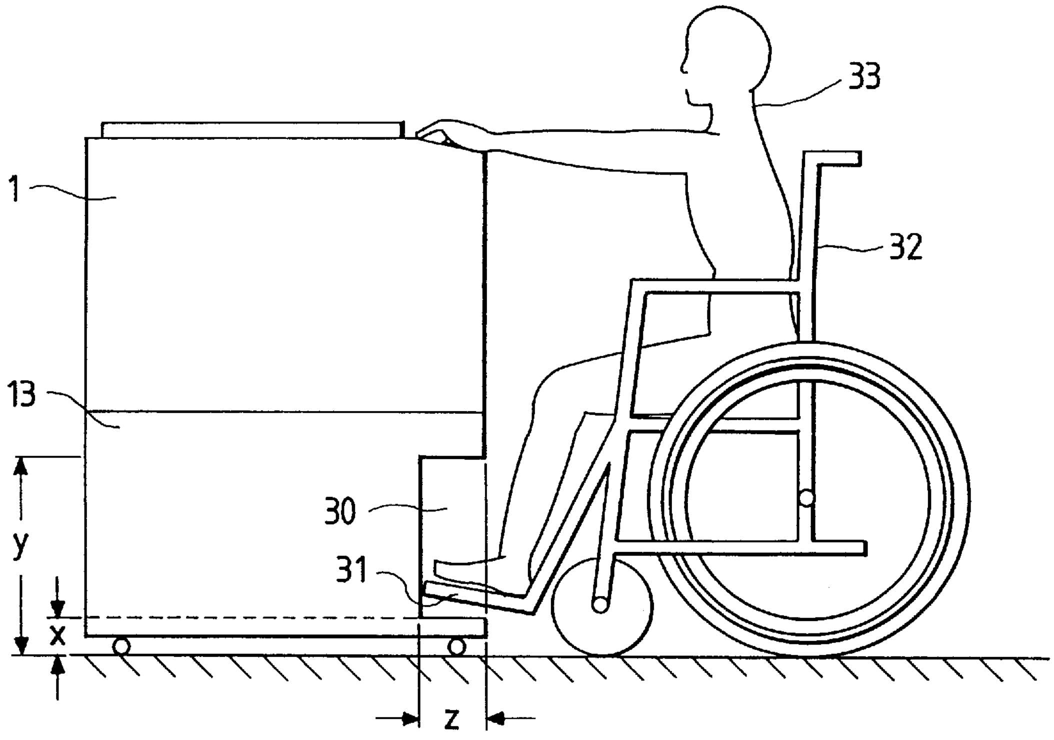
FIG. 2 is a view showing a direction change operation by wheelchair user.
Figure 3:
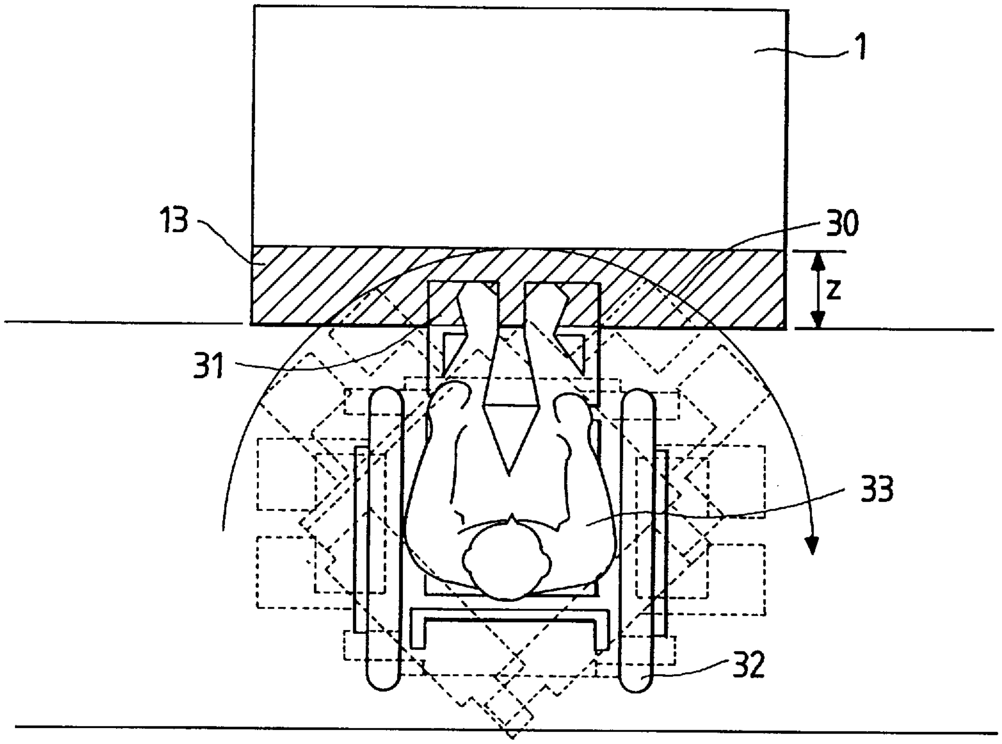
FIG. 3 is a view for explaining the direction change operation by the wheelchair user.

Referring to FIGS. 1 and 2, a copy machine 1 is placed on the upper surface of a pedestal 13. A concave space 30 is formed in the pedestal 13 to extend from the front portion to side portions continuous to the front portion. This space 30 is formed to prevent footrest portions 31 of a wheelchair 32 from interfering with the front surface of the pedestal when a wheelchair user 33 faces the front surface of a copy machine. The space 30 has a height, e.g., from a position spaced apart from the floor surface by a height x of less than 5 cm to a position spaced apart from the floor surface by 22 cm or more. The space 30 has a depth z of 5 cm or more. Casters are attached to the bottom portions of the pedestal 13, and the pedestal 13 can be moved while supporting a copy machine 1 thereon.

FIG. 2 shows a state in which the footrest portions 31 of the wheelchair 32 of the wheelchair user 33 enter into the space 30 of the pedestal 13, so that the wheelchair user faces the front surface of the copy machine 1.

An operation for causing the wheelchair user 33 to operate the copy machine 1 will be described with reference to FIG. 3.

① The wheelchair user 33 comes close to the copy machine 1 from the right (or left) direction, and the wheelchair user performs a copy operation while a wheel surface (to be referred to a wheelchair side surface hereinafter) of the wheelchair 32 contacts the front surface of the pedestal 13. In this embodiment, the wheelchair right side surface opposes the front surface of the pedestal 13.

② When the copy operation is completed, the wheelchair user rotates the wheelchair clockwise (indicated by an arrow) through 90° so as to cause the footrest portions 31 to enter the space 30. The wheelchair 32 faces the front surface, as shown in FIG. 2.

③ The wheelchair user further rotates the wheelchair 32 to move the footrest portions 31 out of the space 30, thereby changing the direction of the wheelchair. That is, the wheelchair is rotated through 180° from the state in ①, and the wheelchair left side surface is caused to oppose the front surface of the pedestal 13. The user then returns to a direction opposite to the forward direction, i.e., to the right direction (upward in FIG. 3).

With the above arrangement, when the wheelchair user 33 uses the copy machine installed in a limited space such as a narrow passage, the direction of the wheelchair 32 can be changed without causing the footrest portions 31 of the wheelchair 32 to interfere with the front surface of the pedestal 13, thereby improving operability.

An equipment placed on the pedestal 13 is not limited to the copy machine, but can be replaced with a facsimile apparatus, a telephone set, a cabinet, a map case, or the like.

Figure 4:
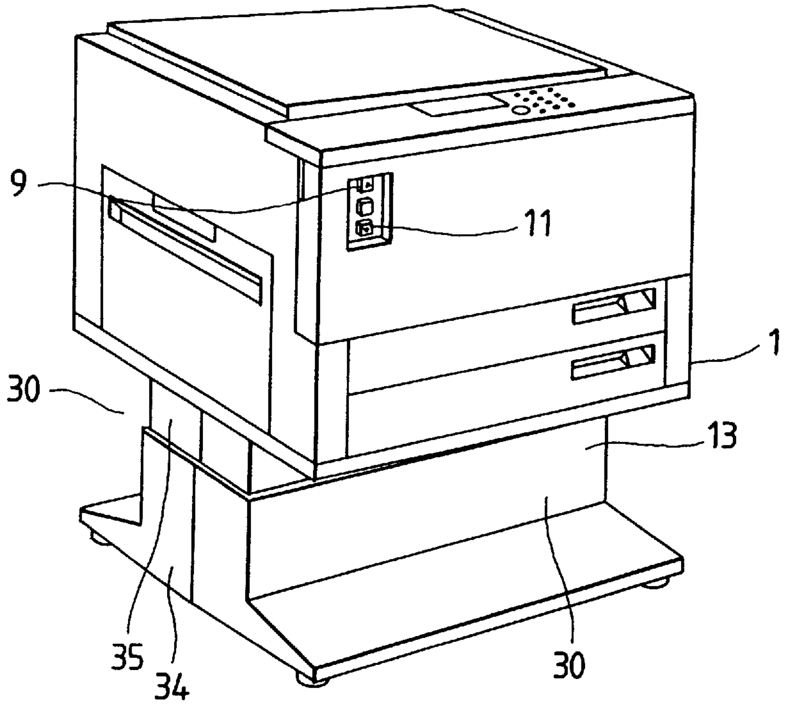
FIG. 4 is a perspective view showing a state in which a copy machine is placed on a pedestal.
Figure 5:
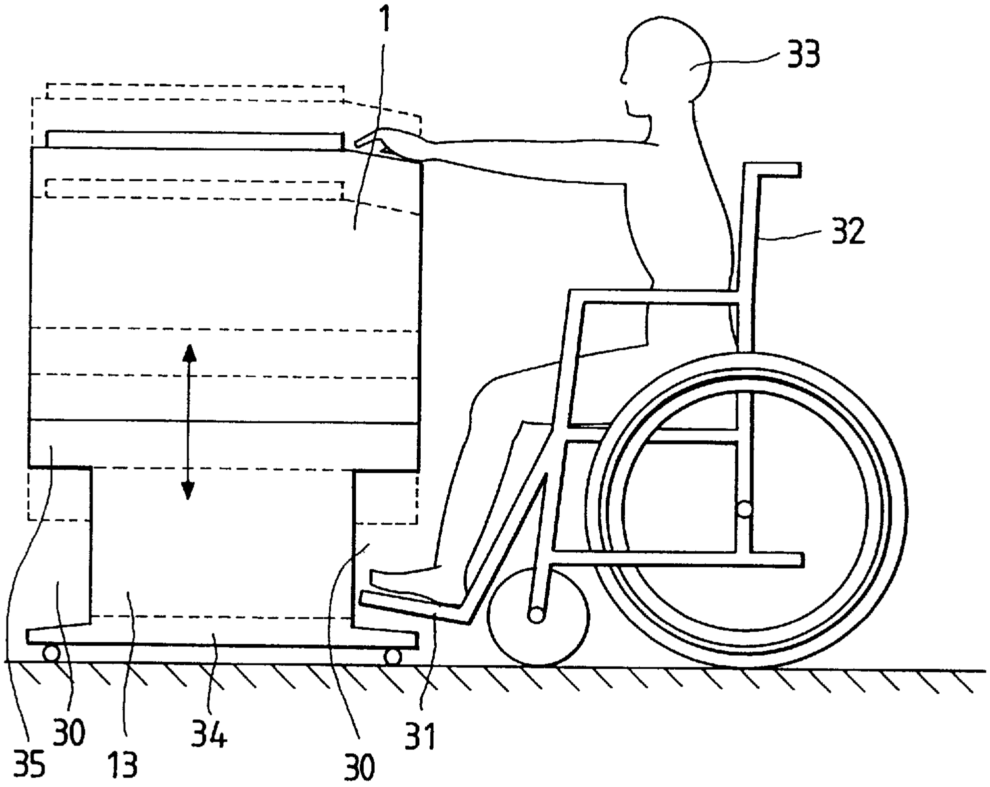
FIG. 5 is a view for explaining an operation for vertically moving the pedestal.

A pedestal according to another embodiment will be described with reference to the accompanying drawings. FIG. 4 is a perspective view showing a state in which a copy machine is placed on the pedestal, and FIG. 5 is a view for explaining a state in which a wheelchair user operates the copy machine. In this embodiment, a pedestal having a space 30 has an elevating mechanism for adjusting a height in accordance with an electrical, hydraulic, or pneumatic scheme.

Referring to FIG. 4, the pedestal 13 comprises a pedestal base 34 serving as a main body and an elevating unit 35. A copy machine 1 is placed on the elevating unit 35. In this embodiment, the copy machine 1 is electrically connected to the pedestal 13. An up or down switch 9 or 11 arranged on the copy machine 1 is depressed to vertically move the elevating unit 35. The pedestal 13 has spaces 30 in its front and rear surfaces. The copy machine 1 can be placed facing the front or rear surface of the elevating unit 35. Casters are attached to the bottom portions of the pedestal 13, so that the pedestal 13 can be moved along the floor surface.

The height can be adjusted by the elevating mechanism in accordance with the height of a user or an application purpose. A user can be closer to the copy machine due to the presence of the spaces 30, and operability of the copy machine 1 placed on the pedestal 13 can be further improved.

An operation for causing a wheelchair user 33 to operate the copy machine 1 will be described with reference to FIG. 5.

① The wheelchair user 33 comes close to the copy machine 1 from the right (or left) direction, and the wheelchair right side surface is brought into contact with the front surface of the pedestal 13 (a user who does not use a wheelchair stands at the front surface of the pedestal 13).

② The up or down switch 9 or 11 arranged on the copy machine 1 is depressed in accordance with the height of the user or an application purpose to adjust the height of the pedestal 13, thereby performing a copy operation. At this time, footrest portions 31 (or feet) of a wheelchair 32 can enter the space 30, and the user can come close to the copy machine 1 to perform the copy operation facing the front surface of the copy machine 1, thereby improving the operability.

③ When the copy operation is completed, the wheelchair user 33 rotates the wheelchair 32 through 90° in a predetermined direction to change the traveling direction. The wheelchair user can move in the predetermined traveling direction.

As described above, a space is formed at each predetermined position of the pedestal for supporting an image forming apparatus or the like. When a wheelchair user uses the image forming apparatus, the footrest portions of the wheelchair can enter the space to change the direction of the wheelchair, thereby reducing the operation area and improving operability.

An elevating pedestal will be described in detail below.

Figure 6:
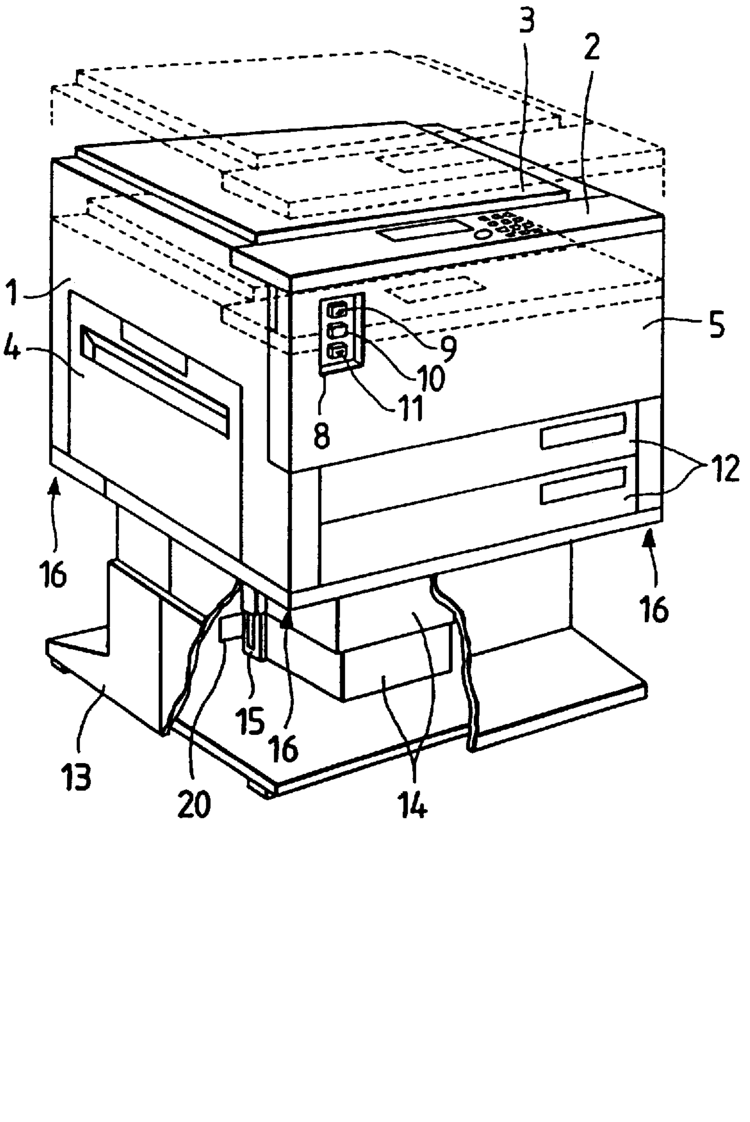
FIG. 6 is a perspective view showing a copy machine main body and a pedestal having an elevating apparatus.
Figure 7:
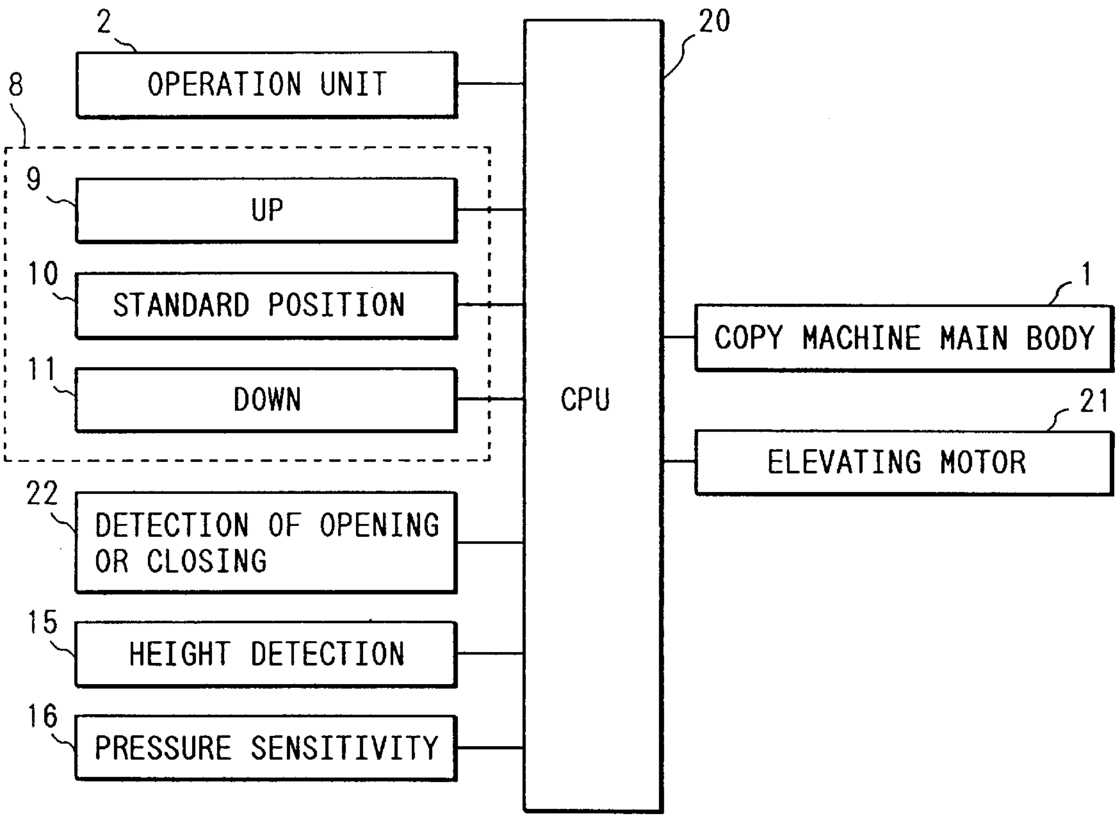
FIG. 7 is a block diagram of the copy machine main body and the elevating apparatus.
Figure 11:
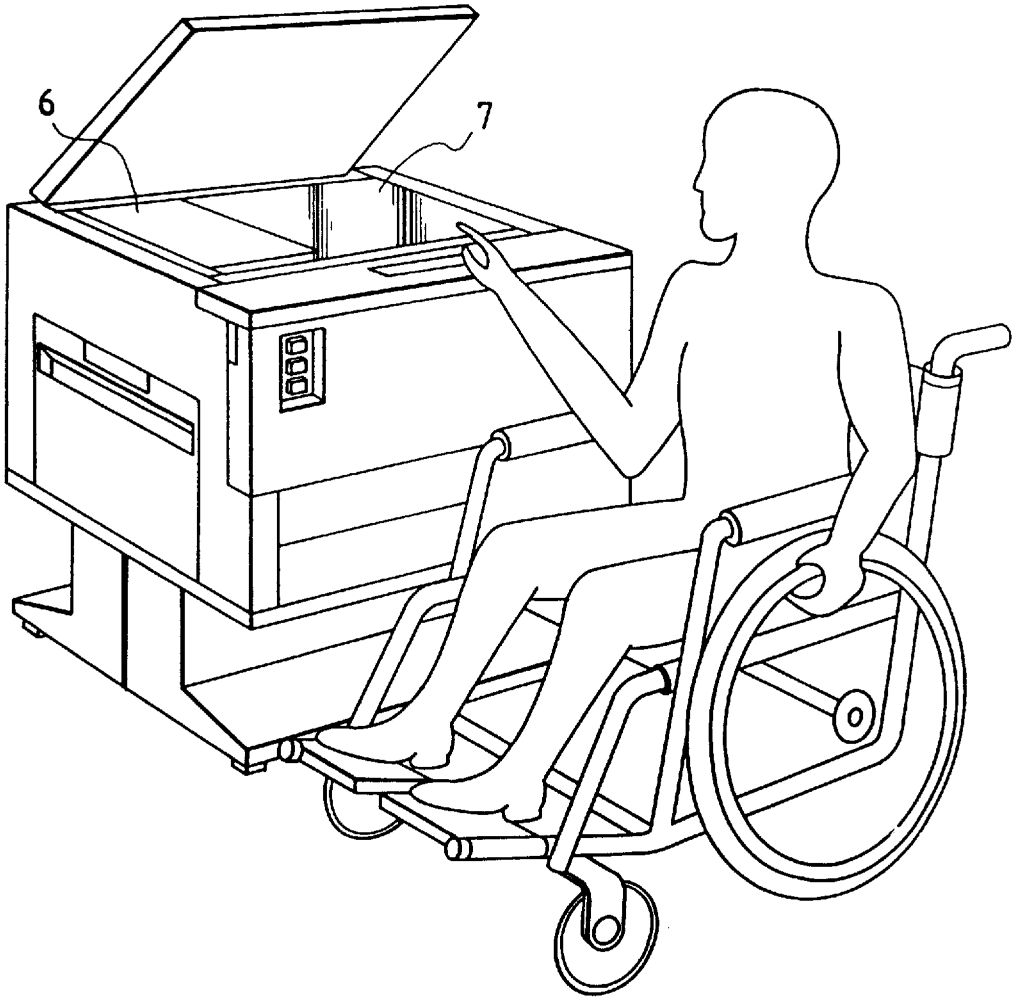
FIG. 11 is a view showing a state in which the wheelchair user uses the copy machine.

FIG. 6 is a perspective view showing the overall structure of a copy machine. FIG. 7 is a block diagram of a copy machine main body 1 and an elevating apparatus 14. A pedestal 13 has the elevating apparatus 14 for vertically moving the copy machine main body 1. An operation unit 2 is arranged on the upper surface of the copy machine main body 1. A user can select a copy count, a copy magnification, a copy sheet, and the like at the operation unit 2. A platen glass 7 is arranged on the upper surface of the copy machine main body 1 to place an original thereon. An original 6 is set on the platen glass 7 (FIG. 11). An original press plate 3 holds the original set on the platen glass 7 and can be opened or closed. A discharge paper cover 4 and a front cover 5 are doors which can be opened/closed to perform jam processing upon occurrence of a paper jam. An elevating operation panel 8 is used to operate the elevating apparatus 14. An up switch 9 for moving the copy machine main body 1 upward, a down switch 11 for moving the copy machine main body 1 downward, and a standard position moving switch 10 for moving the copy machine main body 1 to a standard position are arranged on the front surface of the copy machine main body 1, i.e., the elevating operation panel 8. ON-OFF signals from these switches are supplied to a CPU 20, and the copy machine main body 1 and the elevating apparatus 14 are controlled by the CPU 20. A paper cassette 12 stores paper sheets. Sensors 22 for detecting opening or closing are arranged at the original press plate 3, the paper discharge cover 4, the front cover 5, and the paper cassette 12.

A pressure sensitive sensor 16 detects contact of an object. A detection signal from the pressure sensitive sensor 16 is sent to the CPU 20.

Figure 8:
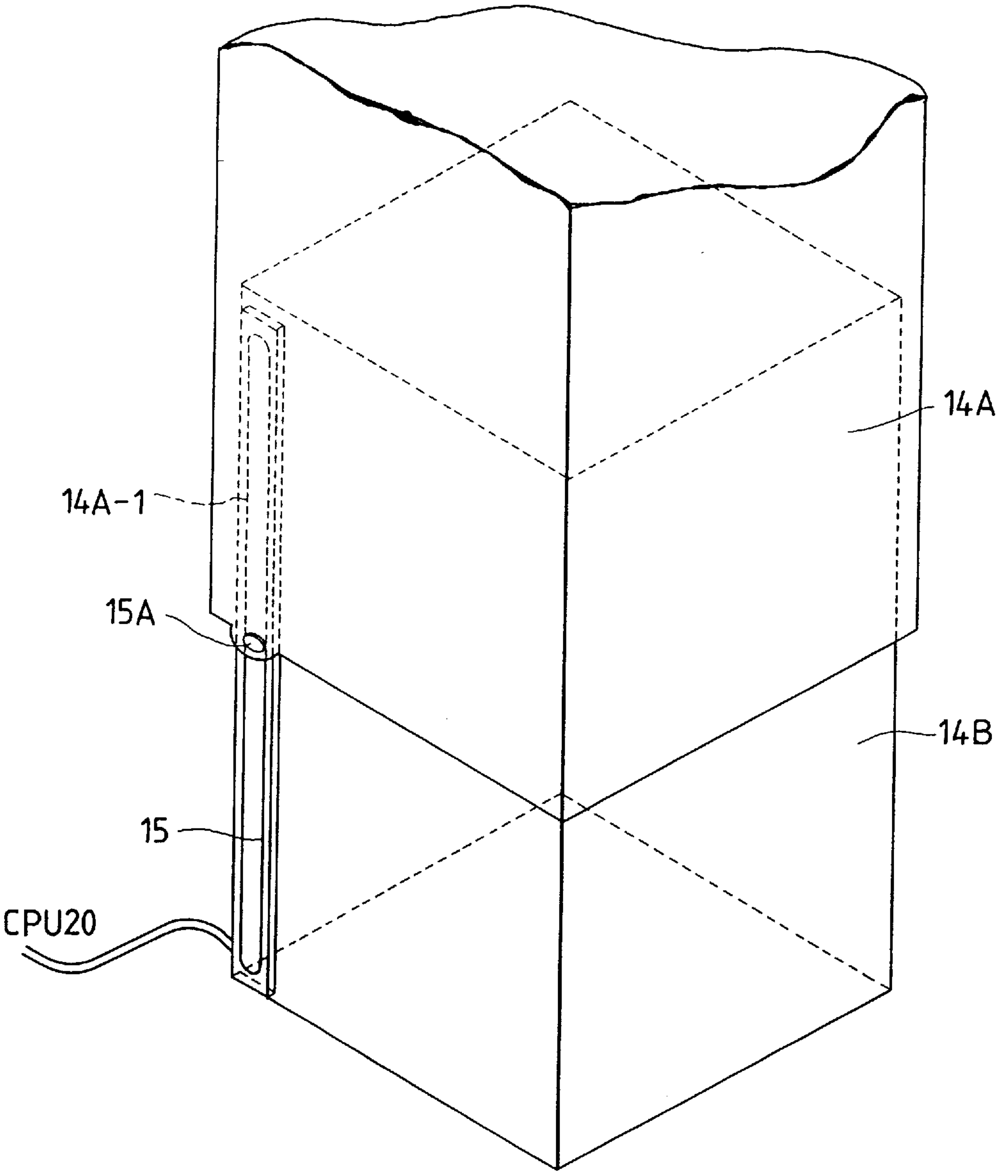
FIG. 8 is an enlarged view showing part of an elevating mechanism of the elevating apparatus.

The elevating apparatus 14 will be described below. FIG. 8 is an enlarged view showing the elevating mechanism of the elevating apparatus 14. The elevating mechanism has a base 14B fixed to the pedestal base. An elevating unit 14A vertically moves together with the copy machine main body 1. The elevating unit 14A is vertically moved by an elevating motor 21 arranged in the base 14B. The internal structure of the elevating apparatus 14 is known to those skilled in the art, and a detailed description thereof will be omitted. In this embodiment, an electrical elevating apparatus is used, but a hydraulic or pneumatic elevating apparatus may be used. A detection mechanism for detecting the height of the copy machine main body 1 is arranged in the elevating apparatus 14. A slide volume 15 detects the height and is fixed to the base 14B. An output from the slide volume 15 is connected to the CPU 20. A projection 15A is formed on the slide volume 15. The projection 15A is moved to change the resistance of the slide volume 15. The projection 15A is engaged with an engaging portion 14A-1 formed in the elevating unit 14A. The resistance of the slide volume 15 changes in accordance with the vertical movement of the elevating unit 14A.

The relationship between the height of the copy machine and operability will be described below.

Figure 9:
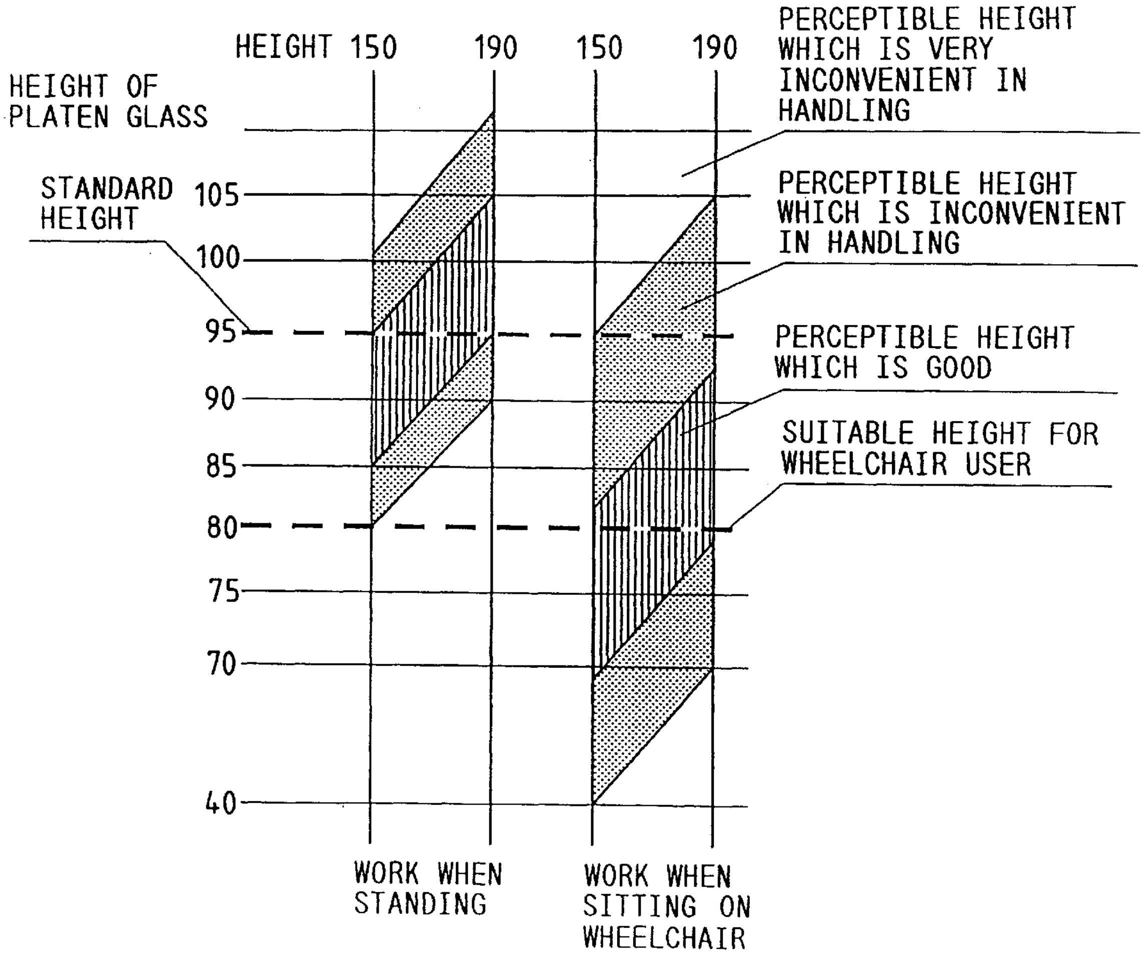
FIG. 9 is a view showing a relationship between the height of a copy machine and operability.

FIG. 9 shows examination results of heights of the operation unit 2 and the platen glass 7 of the copy machine, which can be perceived to be convenient for operation when users having heights ranging from 150 cm to 190 cm operate the copy machine.

A height for a standing user, i.e., the standard height preferably falls within the range of about 90 cm to 100 cm. In the copy machine of this embodiment, the standard height is set to 95 cm. As can be apparent from FIG. 9, a height for a wheelchair user is about 80 cm to improve operability when users having heights ranging from 150 cm to 190 cm sit on wheelchairs. In this embodiment, the optimal height for the wheelchair user is lower than the standard height (95 cm) by about 15 cm.

According to a similar examination, when a wheelchair user performs paper replenishment work to the cassette 12 or jam processing upon opening the paper discharge cover 4 and the front cover 5, the optimal height for the wheelchair user is higher than the standard height by about 15 cm. In this embodiment, the elevating apparatus 14 is adjusted so that the upper surface of the copy machine main body 1 can be vertically moved in the range of 80 cm to 110 cm from the floor surface. That is, the slide volume 15 is adjusted so that it can detect heights from at least the 80-cm position to at least the 110-cm position of the upper surface of the copy machine main body 1.

Figure 10:
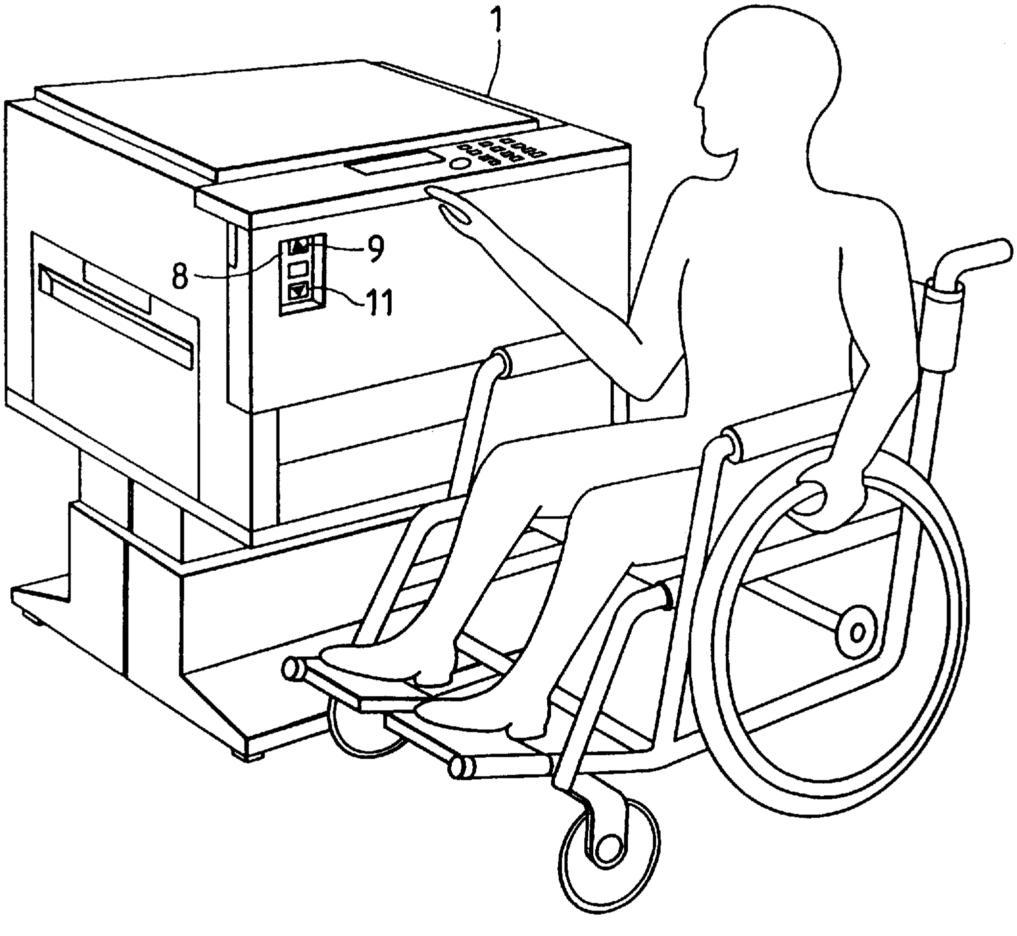
FIG. 10 is a view showing a state in which a wheelchair user uses a copy machine.

The elevating operation of the copy machine main body will be described below. FIG. 10 shows a state in which the height is adjusted for a standing user. As described above, the user depresses the up switch 9 on the elevating operation panel 8 to move the copy machine main body 1 upward and the down switch 11 to move it downward. When a wheelchair user depresses the down switch 11 so as to perform an easy copy operation, the CPU 20 drives the elevating motor 21 to start a downward movement of the elevating apparatus 14. When the slide volume 15 detects the 80-cm position (i.e., the optimal position of the copy machine main body 1 which is suitable for the wheelchair user), the CPU 20 stops the elevating motor 20 to stop the elevating apparatus 14. At this height, the wheelchair user can easily perform the copy operation, as shown in FIG. 11.

Figure 12:
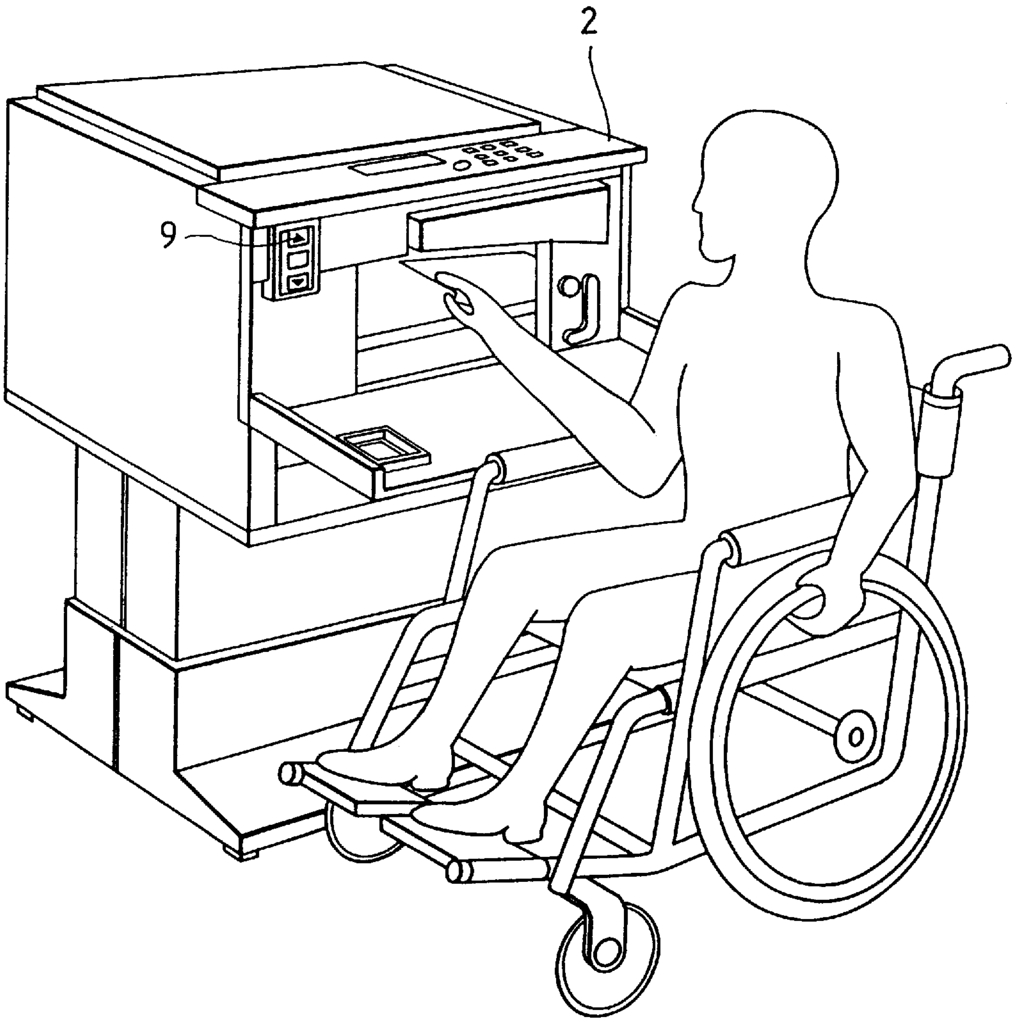
FIG. 12 is a view showing a state in which the wheelchair user operates the copy machine.
Figure 13:
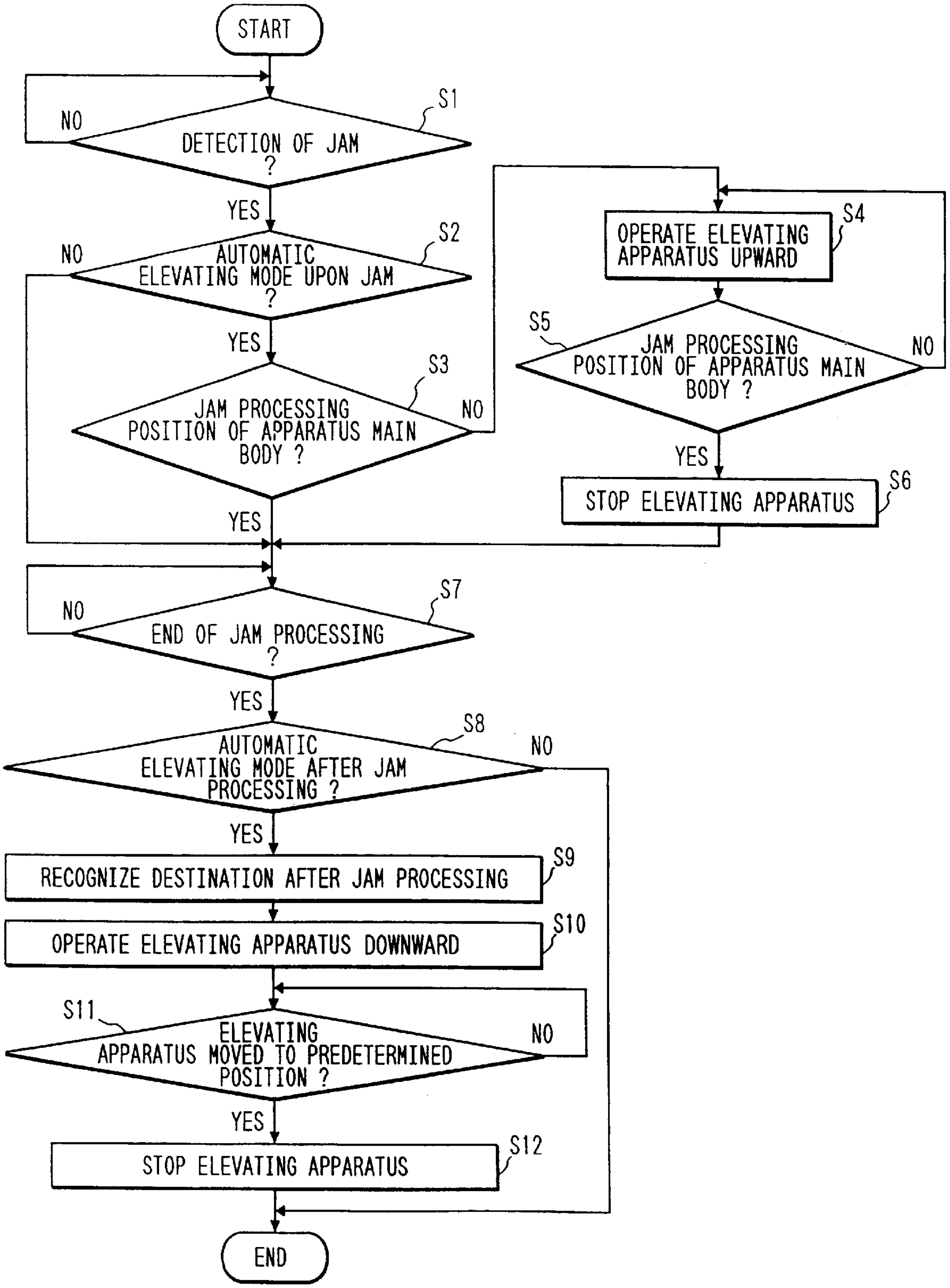
FIG. 13 is a flow chart showing control in an automatic elevating mode.

An operation performed upon occurrence of a trouble such as a paper jam in the copy machine main body 1 will be described below. As described above, the copy machine main body 1 can be easily handled in jam processing when the copy machine main body 1 is located at the 110-cm position. When a wheelchair user depresses the up switch 9, the CPU 20 drives the elevating motor 21 to cause the elevating apparatus 14 to start moving upward. When the slide volume 15 detects the 110-cm position, the CPU 20 stops the elevating motor 21. The copy machine main body 1 is thus moved upward to cause the wheelchair user to easily perform jam processing, as shown in FIG. 12. This copy machine has an automatic elevating mode set upon occurrence of a paper jam. The user can select the automatic elevating mode at the operation unit 2 in advance. The control sequence of the CPU 20 in the automatic elevating mode is shown in FIG. 13. When a jam of the copy machine main body 1 is detected (step S1), the CPU 20 automatically stops the copy operation and at the same time starts moving the elevating motor 21 upward. The elevating apparatus 14 is moved upward to a position where the wheelchair user can optimally perform the jam processing (steps S2, S3, S4, S5, and S6). After the jam processing is completed, the elevating apparatus is returned to the previous position and stopped (steps S7, S8, S9, S10, S11, and S12). Therefore, the user can perform jam processing without operating the elevating operation panel 8. In addition, this copy machine also has an automatic reset mode of the elevating apparatus 14. More specifically, when a predetermined period of time has elapsed at the end of the copy operation, the CPU 20 operates the elevating apparatus 14 to move the copy machine main body 1 to the preset level. The user can arbitrarily set a period from which the automatic return operation is started, at the operation unit 2. It is also possible for the user to set whether the automatic return mode is to be set. If majority users are standing users, the return position is conveniently set at a 95-cm position. If, however, users are mostly wheelchair users, the return position is conveniently set at an 80-cm position. In intermediate cases, the automatic return function may be set in an OFF state.

Figure 14:
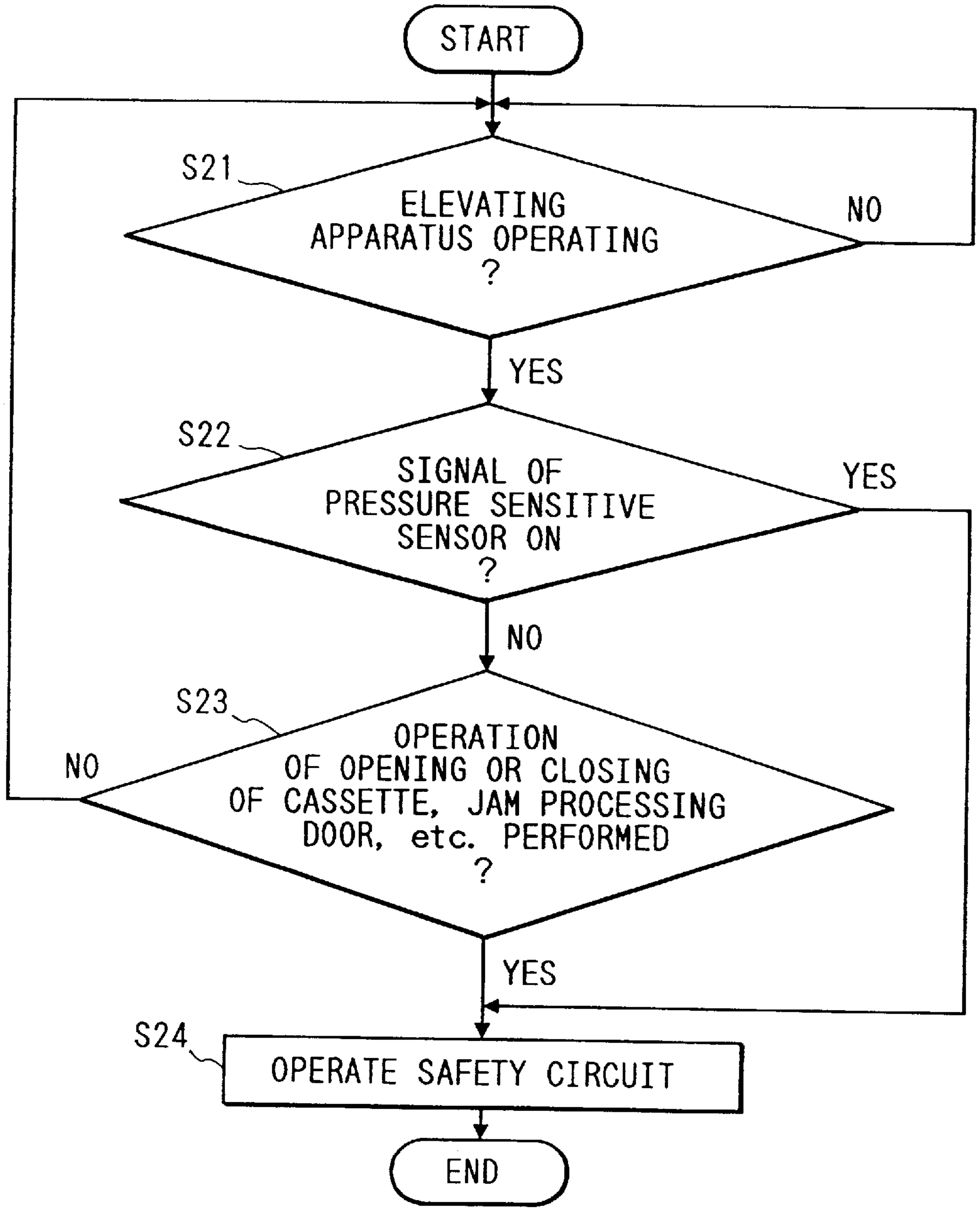
FIG. 14 is a flow chart showing safety control during the operation of the elevating apparatus.

A safety function will be described below. The safety function is provided to the elevating apparatus 14 and the copy machine main body 1 to prevent danger during an elevating operation of the elevating apparatus 14. When a hand or foot of the user touches the lower surface of the copy machine main body 1, the pressure sensitive sensor 16 detects the contact pressure and sends a detection signal to the CPU 20. The CPU 20 determines that a dangerous situation has occurred, and the CPU 20 stops the elevating motor 21 to stop the vertical movement of the elevating apparatus 14. In this embodiment, the elevating operation is immediately stopped. However, the elevating apparatus 14 can be returned by a small distance and then be stopped to prevent over-stroking. In this embodiment, the pressure sensitive sensor is used, but a proximity sensor for detecting the proximity of an object may be used to stop the elevating apparatus before the object contacts the copy machine main body. Opening/closing sensors 22 are arranged at the original press plate 3, the paper discharge cover 4, the front cover 5, and the paper cassette 12 of the copy machine main body 1 which are handled by the user to detect their open/closed states. Detection signals from the opening/closing sensors 22 are transmitted to the CPU 20. It is dangerous to open/close the original press plate 3, the paper discharge cover 4, the front cover 5, or the paper cassette 12 during the operation of the elevating apparatus 14. In particular, an upward movement of the copy machine main body 1 may endanger a wheelchair user performing jam processing, paper replenishment, or original setting because the movable range of the wheelchair user is limited. For this reason, when the open/closed states of the original press plate 3, the front cover 5, and the like are detected by the opening/closing sensors 22 during the operation of the elevating apparatus 14, i.e., when it is determined that the wheelchair user performs jam processing, paper replenishment, original setting, or the like, a safety stop command is output as in the above safety function, so that the elevating apparatus 14 is automatically and safely stopped. This control sequence is shown in a flow chart of FIG. 14.

An elevating operation during copying will be described below. An image forming apparatus such as a copy machine is generally a high-precision machine, and its structure is relatively susceptible to vibrations. This also applies to the copy machine of this embodiment. When the copy machine main body 1 is vibrated during a copy operation, a copied image is disturbed. For this reason, an operation of the elevating operation panel 8 during a copy operation is ignored. A trouble caused by an elevating operation during a copy operation to result in a copy error can be prevented in advance. Note that the start of a copy operation may be controlled to be inhibited during an elevating operation.

Figure 15:
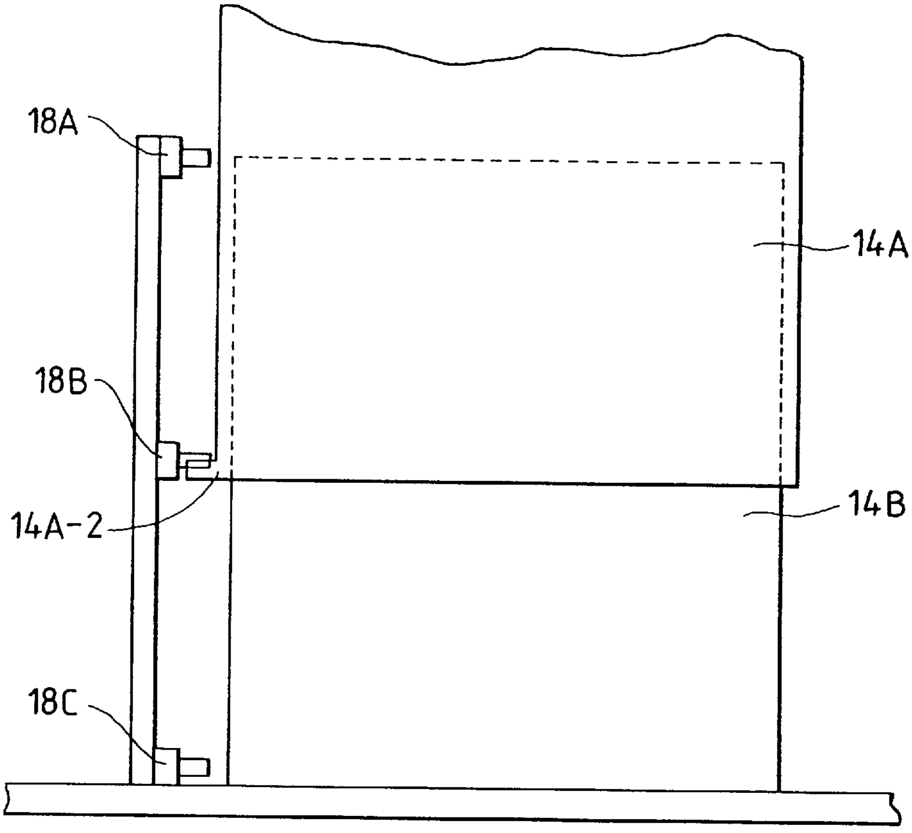
FIG. 15 is an enlarged view showing part of an elevating mechanism according to another embodiment.

Still another embodiment will be described below. In the above embodiment, the height detecting means using the slide volume 15 is used. However, the height detecting means is not limited to this. A height detecting means using a photosensor, as shown in FIG. 15, may be used. Outputs from photosensors 18A, 18B, and 18C are connected to a CPU 20. A sensor flag 14A-2 is formed by part of an elevating unit 14A. The sensor flag 14A-2 is moved together with the elevating unit 14A to shield the photosensors 18A, 18B, and 18C. When the sensor flag 14A-2 shields the photosensor 18A, a copy machine main body 1 is set at a height as a 110-cm position from the floor surface. When the sensor flag 14A-2 shields the photosensor 18B, the copy machine main body 1 is set at a height as a 95-cm position from the floor surface. When the sensor flag 14A-2 shields the photosensor 18C, the copy machine main body 1 is set at a height as an 80-cm position from the floor surface.

This embodiment exemplifies height control for a wheelchair user. However, the present invention is not limited to this. The height of the copy machine main body can be changed and set in a state wherein a user in question can easily handle it, thereby improving operability and working efficiency.

As described above, since a pedestal for supporting an image forming apparatus is vertically moved in accordance with an input command, operations associated of the image forming apparatus can be easily performed by a standing or sitting user, thereby improving operability and working efficiency.

Figure 16:
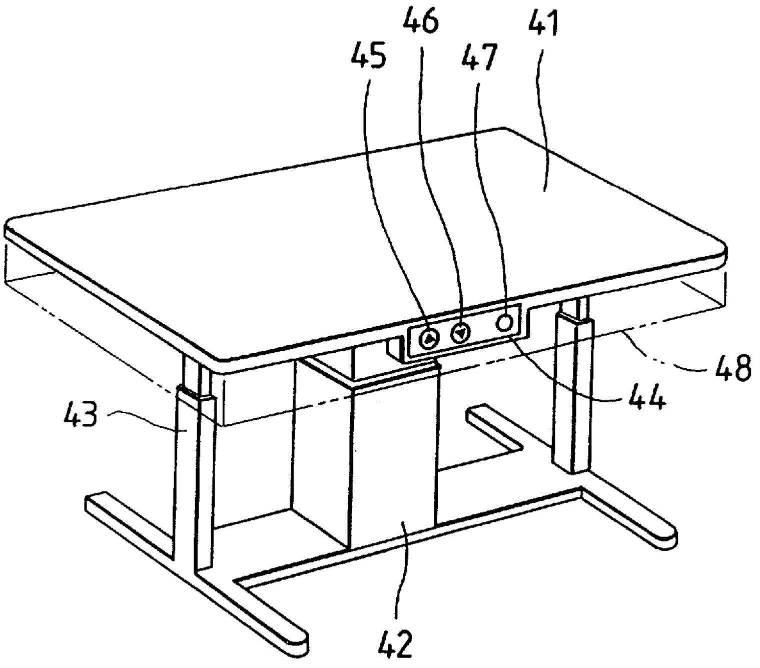
FIG. 16 is a perspective view showing a pedestal according to the embodiment shown in FIG. 15.

Still another embodiment which is more versatile will be described below. FIG. 16 is a perspective view showing a pedestal for supporting an equipment according to this embodiment. A pedestal 41 supports an equipment thereon. Extendible legs 43 support the pedestal 41. An elevating apparatus 42 vertically moves the pedestal 41. An operation unit 44 operates an elevating operation. An up switch 45 for moving the pedestal 41 upward, a down switch 46 for moving the pedestal 41 downward, and a memory switch 47 for memorizing a height are arranged in the operation unit 44.

A pressure sensitive sensor 48 detects contact with an object, and a signal from the pressure sensitive sensor 48 is supplied to a CPU 20 shown in FIG. 7. The elevating apparatus is the same as that described with reference to the above embodiment.

Figure 17:
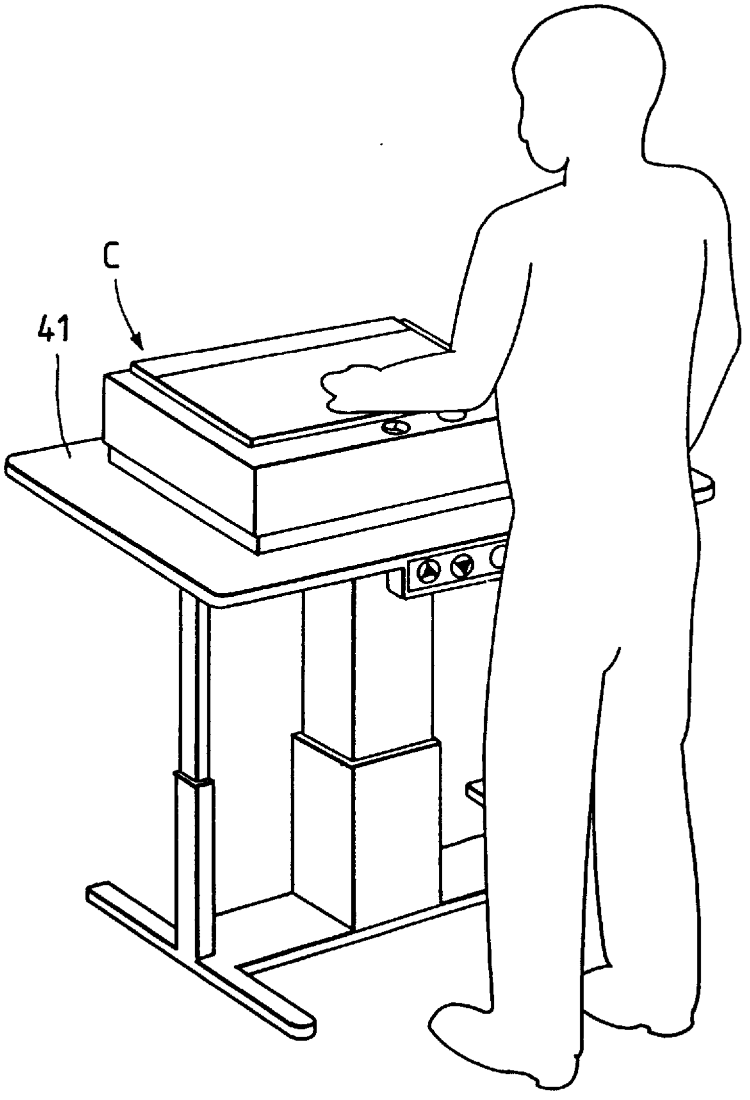
FIG. 17 is a view for explaining a state in which the pedestal is set to have a height suitable for a standing user to operate an office equipment.
Figure 18:
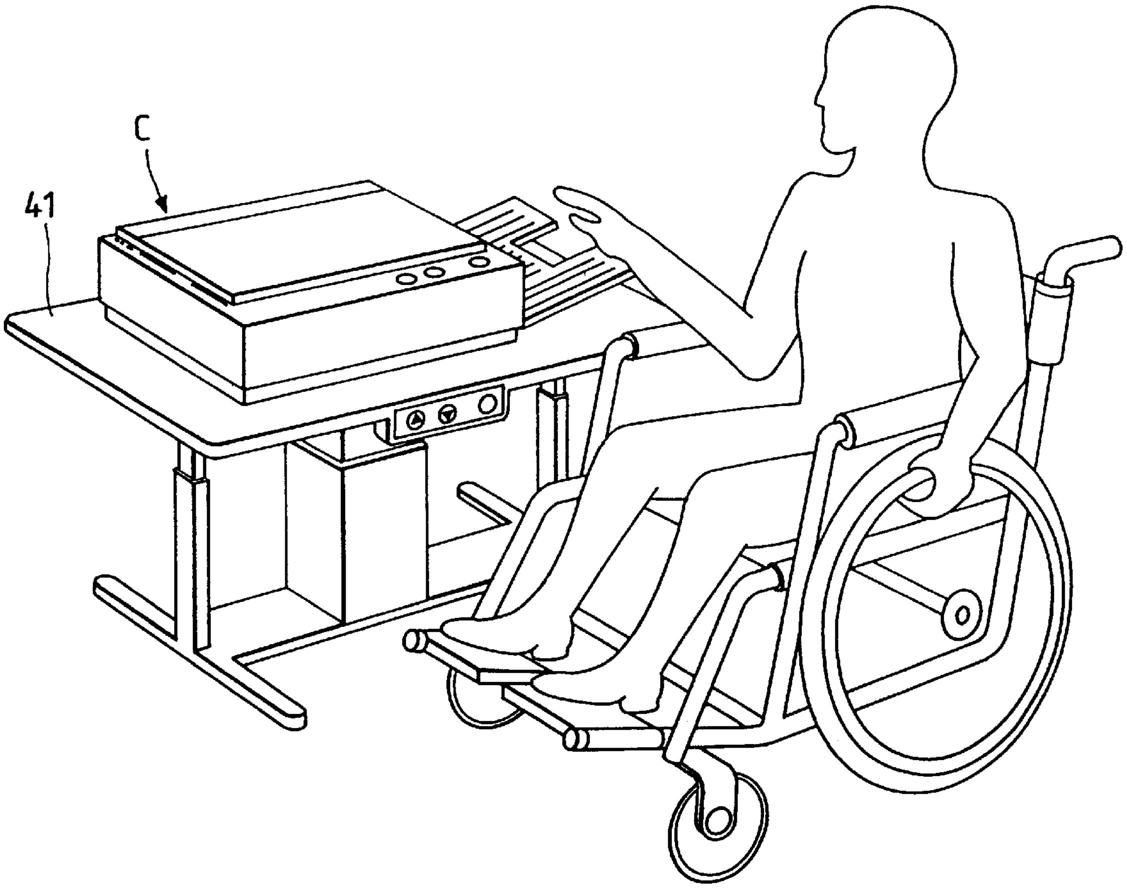
FIG. 18 is view for explaining a state in which the pedestal is set to have a height suitable for a sitting user to operate an office equipment.
Figure 19:
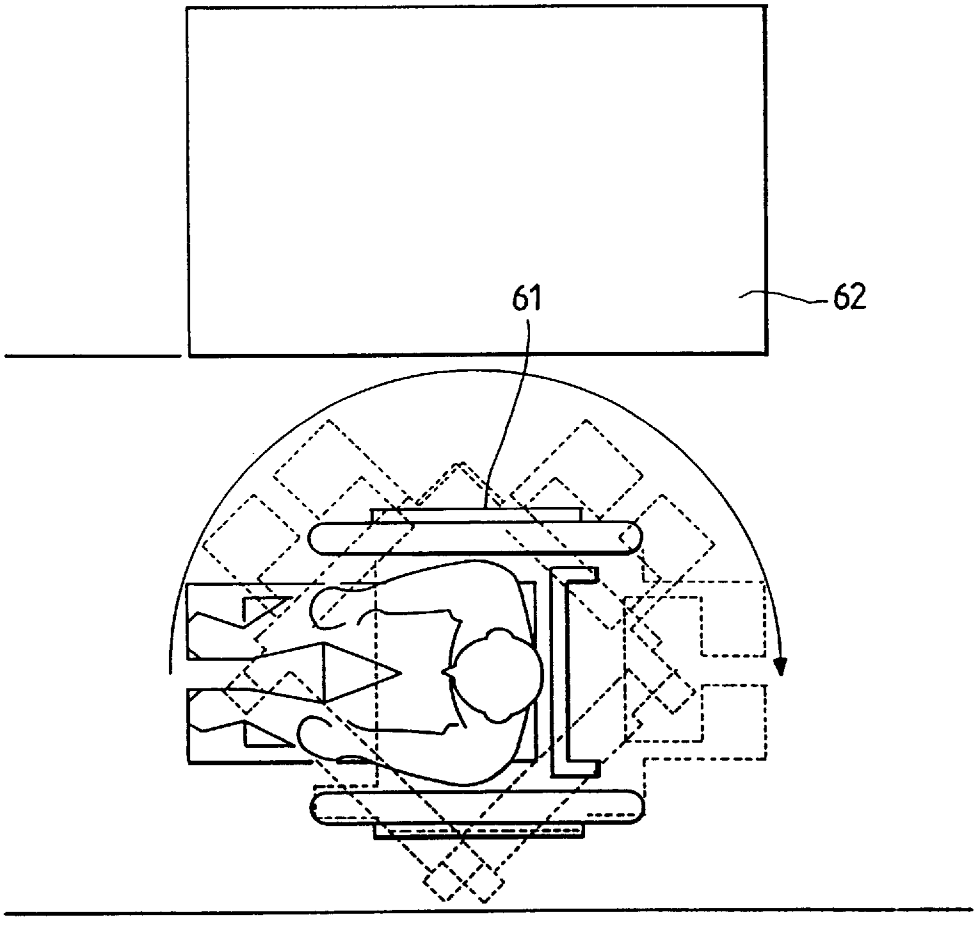
FIG. 19 is a view for explaining a conventional direction change operation by a wheelchair user.
Figure 20:
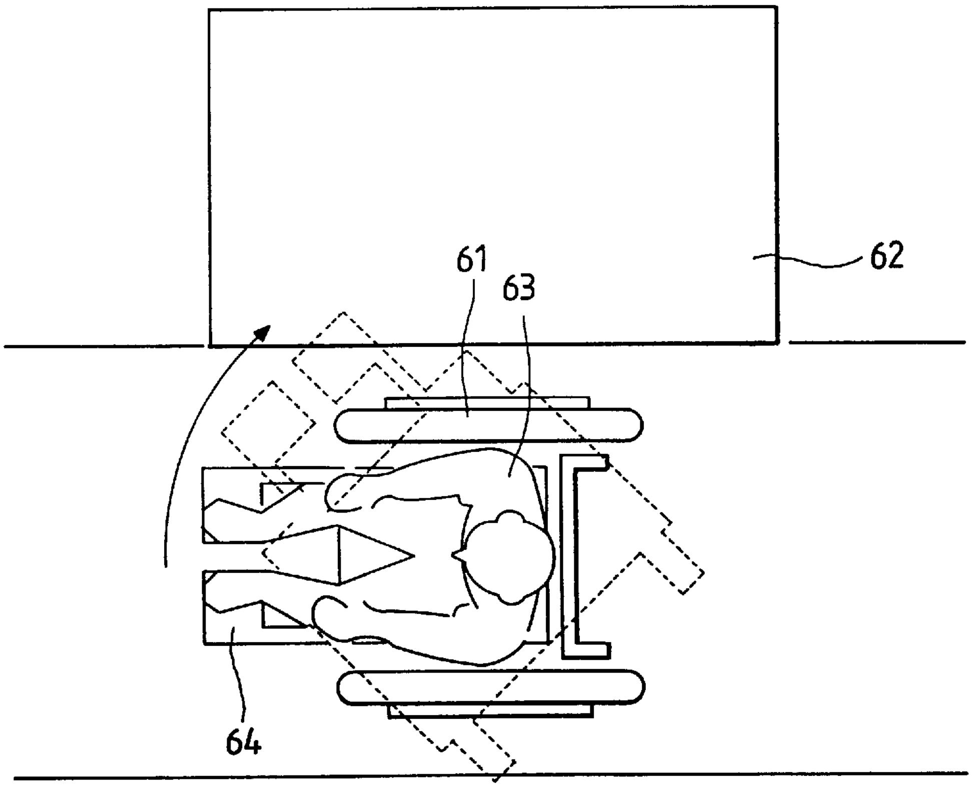
FIG. 20 is a view for explaining a conventional direction change operation by a wheelchair user.
Figure 21:
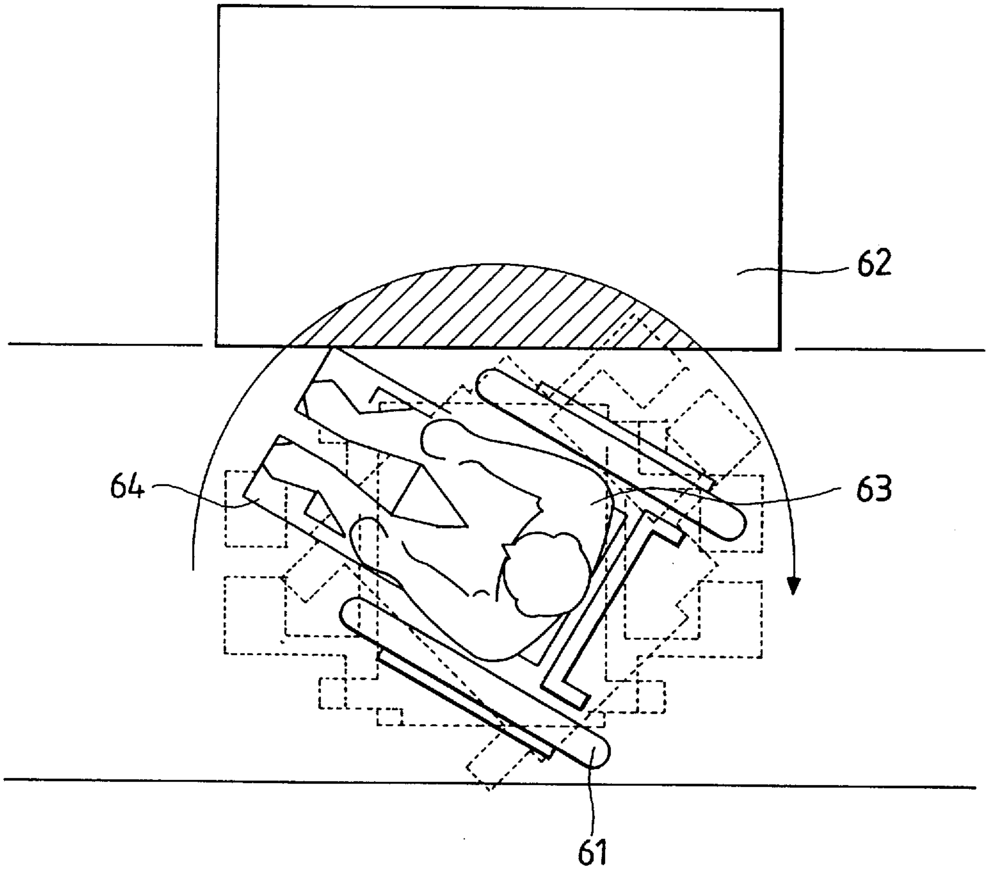
FIG. 21 is a view for explaining a conventional direction change operation by a wheelchair user.
Figure 22:
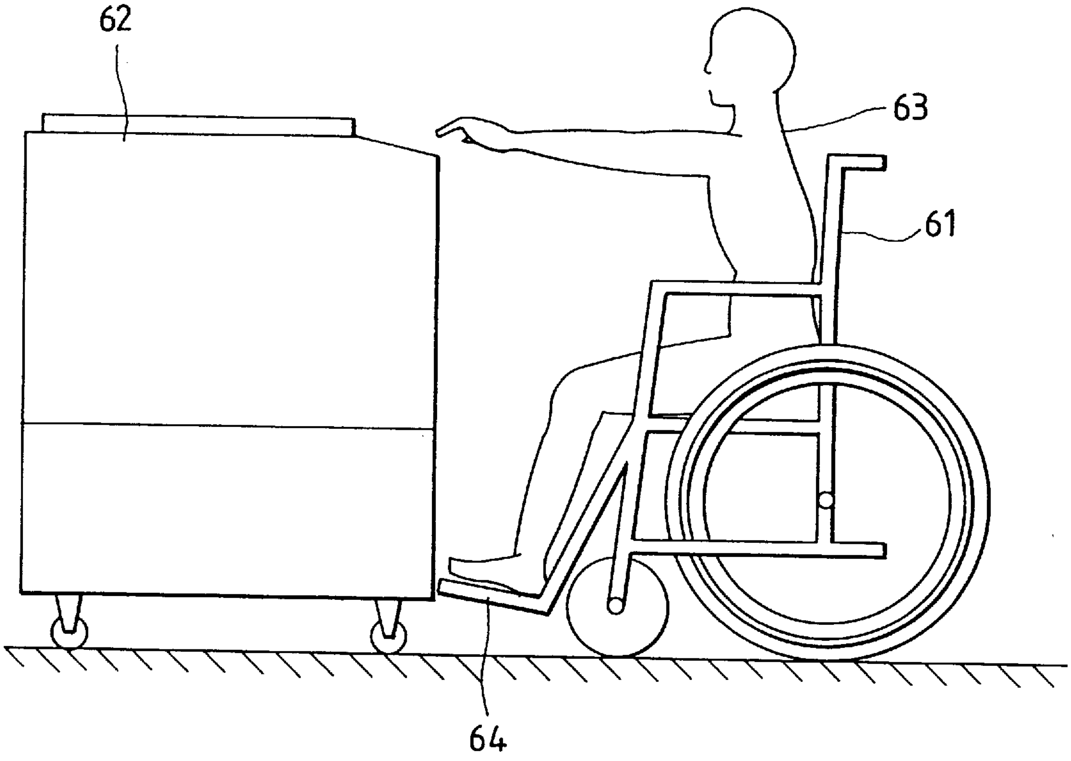
FIG. 22 is a view for explaining a state in which footrest portions of a conventional wheelchair interfere with a pedestal.
Figure 23:
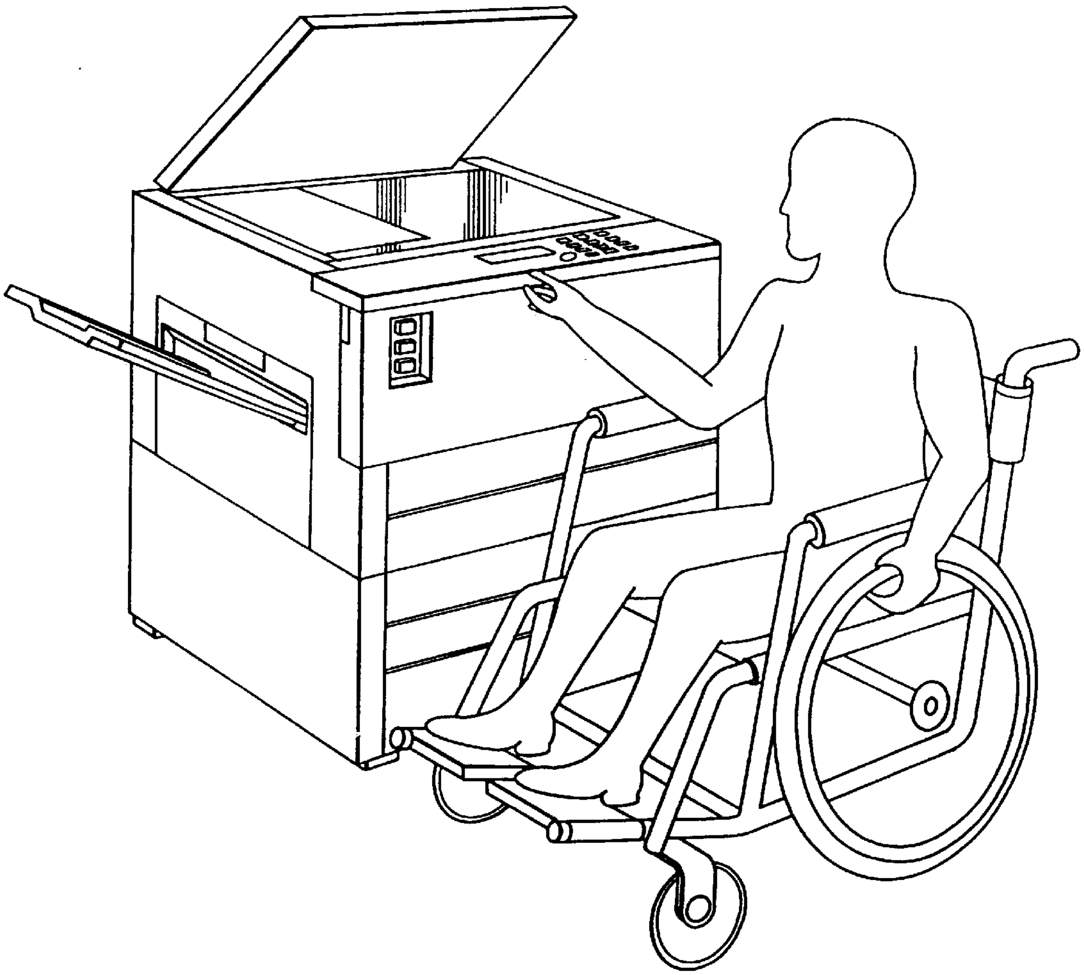
FIG. 23 is a perspective view of a conventional copy machine.

FIG. 17 shows a state wherein the pedestal 41 is located at a 1,000-mm position suitable for a standing user. At this time, when a wheelchair user depresses the down switch 46 in the operation unit 44, the pedestal 41 is moved downward and stops when a slide volume detects a 600-mm position. FIG. 18 shows this state. At this height, the wheelchair user can optimally and conveniently handle a copy machine.

An operation for stopping the pedestal 41 at a preset height will be described below. The up or down switch 45 or 46 on the operation unit 44 is depressed to move the pedestal 41 upward or downward. When the pedestal 41 reaches a predetermined position, the memory switch 47 is depressed to stop the pedestal 41 at this position.

When the memory switch 47 is kept depressed for a predetermined period of time, e.g., one second or more, this height is memorized. Every time the memory switch 47 is depressed, the pedestal 41 can be moved to this position and stopped.

To change the memorized height, the above operation is repeated again. A plurality of memory switches may be arranged to set a plurality of heights.

The automatic reset mode of the elevating apparatus will be described below. It is possible to automatically operate the elevating apparatus to automatically return the elevating apparatus to a preset height when the pedestal is kept at an appropriate position set by the memory switch for a predetermined period of time. An operator can set a period of time for starting the automatic return operation at the operation unit. In addition, the user can also set whether the automatic return mode is to be set.

If most users are standing users, the return position is conveniently set to a 900-mm position to a 1,000-mm position. If users are mostly wheelchair users, the return position is conveniently set to a 700-mm position to the 900-mm position. In intermediate cases, the automatic return function is set in an OFF state.

A safety function will be described below. The pressure sensitive sensor 48 is arranged at a lower portion of the pedestal 41, as described above. The arrangement of the pressure sensitive sensor 48 is not limited to a specific one. When a hand or foot of a user is clamped between the pedestal 41 and an object located therebelow, or the downward movement of the pedestal becomes impossible due to the presence of such an object, the pressure sensitive sensor

48 transmits a signal to the CPU, and the movement of the pedestal is stopped in accordance with a command from the CPU. In this case, the pedestal can be returned by a small distance first and then be stopped to prevent over-stroking. A proximity sensor for detecting the proximity of an object may be used in place of the pressure sensitive sensor.

What is claimed is:

1. A pedestal comprising:

a surface on which an image forming apparatus can be placed, with a space formed below said surface, with the space allowing a user's body to be inserted therein;

elevating means for elevating said surface; and detecting means, arranged below said surface, for detecting the user's body, and wherein said elevating means stops an operation in response to detection by said detecting means.

2. The pedestal according to claim 1, wherein said elevating means moves said surface to a lowermost position so as to leave the space.

3. The apparatus according to claim 1, further comprising indicating means for indicating a command for vertically moving said pedestal, wherein said indicating means can receive a command for ascending said surface and a command for descending said surface.

4. The apparatus according to claim 1, further comprising indicating means for indicating a command for vertically moving said pedestal, wherein said indicating means can receive a command for moving said surface to a predetermined height.

5. A pedestal comprising:

a surface on which an image processing apparatus can be placed, with a space formed below said surface;

elevating means for elevating said surface; and a pressure sensitive sensors, arranged below said surface, for detecting an object, and wherein said elevating means stops an operation in response to detection by said pressure sensitive sensor.

6. The apparatus according to claim 5, further comprising indicating means for indicating a command for vertically moving said pedestal, wherein said indicating means can receive a command for ascending said surface and a command for descending said surface.

7. The apparatus according to claim 5, further comprising indicating means for indicating a command for vertically moving said pedestal, wherein said indicating means can receive a command for moving said surface to a predetermined height.

8. A pedestal comprising:

a surface on which an image forming apparatus can be placed, with a space formed below said surface;

elevating means for elevating said surface; and control means for controlling said elevating means, wherein said elevating means is controlled by said control means to stop its operation according to when a cover of the image forming apparatus is opened.

9. The apparatus according to claim 8, further comprising indicating means for indicating a command for vertically moving said pedestal wherein said indicating means can receive a command for ascending said surface and a command for descending said surface.

10. The apparatus according to claim 8, further comprising indicating means for indicating a command for vertically moving said pedestal, wherein said indicating means can receive a command for moving said surface to a predetermined height.

11. A pedestal according to claim 8, wherein said cover is any one of an original press plate, a paper discharge cover and a front cover.

12. An elevating apparatus comprising:

a vertically movable pedestal on which an image forming apparatus can be placed;

driving means for vertically moving said pedestal;

indicating means for indicating a command for vertically moving said pedestal; and control means for controlling said driving means in accordance with said command indicated by said indicating means and for determining when the image forming apparatus is forming an image, wherein said control means ignores said command of said indicating means when the image forming apparatus is forming the image.

13. The apparatus according to claim 12, wherein said indicating means can receive a command for ascending said pedestal and a command for descending said pedestal.

14. The apparatus according to claim 12, wherein said indicating means can receive a command for moving said pedestal to a predetermined height.

* * * * *

UNITED STATES PATENT AND TRADEMARK OFFICE

CERTIFICATE OF CORRECTION

PATENT NO. : 5,884,882

DATED : March 23, 1999

INVENTOR(S) : Nada et al.

It is certified that error appears in the above-identified patent and that said Letters Patent is hereby corrected as shown below:

On the title page:

[56] REFERENCES CITED:

U.S. PATENT DOCUMENTS, "4,714,024 12/1987 Wallin et al." should read --4,714,025 12/1987 Wallin et al.--.

COLUMN 10:

Line 12, "pedestal" should read --pedestal,--.

Signed and Sealed this

Sixteenth Day of November, 1999

Attest:

Q. TODD DICKINSON

Attesting Officer

*Acting Commissioner of Patents and Trademarks*